3,310,094
OUTER CASINGS FOR PNEUMATIC TIRES
Henri Marcel Prevost, Paris, France, assignor to Societe Anonyme dite: Pneumatiques, Caoutchouc Manufacture et Plastiques Kleber Colombes, Colombes, Seine, France
Filed May 24, 1965, Ser. No. 458,306
Claims priority, application France, May 27, 1964, 976,280
4 Claims. (Cl. 152—361)

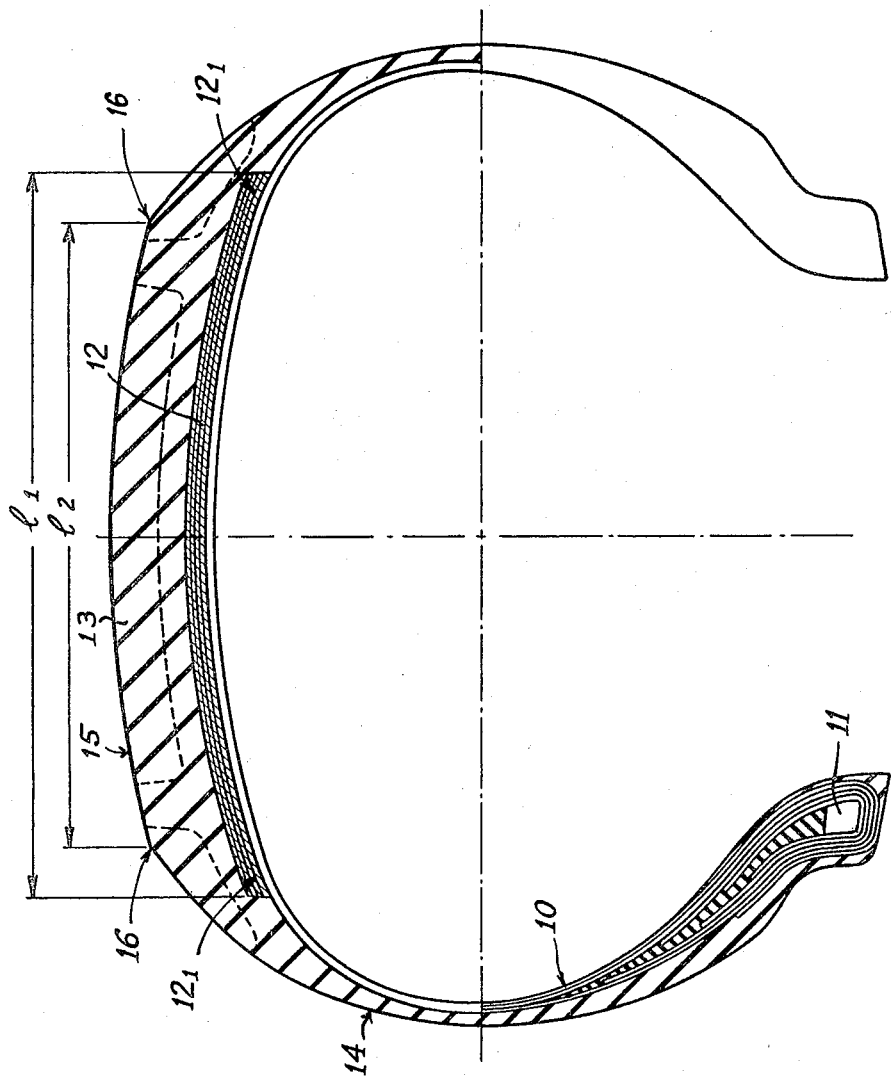

The present invention relates to outer casing for pneumatic tires of the type having a radial carcass and a tread reinforced by an inextensible breaker placed under tension by the pressure of inflation.

It has been observed that when these tires are used at high speeds, for example on sports cars or racing cars which may reach speeds of the order of 200 kilometres per hour or more, they rapidly perish because the edges of the breaker become loose or detached. The edges of the breaker are in fact located near the beads of the tire which are subjected during running to an intensive effect of successive flexions. These flexions give rise to stresses and nipping of the rubber used for connecting the layers of cables constituting the breaker and these stresses are particularly critical at the edges of the breaker, especially when said latter is constituted of one or more pairs of layers of cables forming a small angle with respect to the equatorial plane of the tire.

It has been found that the behaviour of the tires at high speed can be considerably improved, according to the invention by coating the cable layers constituting on the one hand the radial carcass and on the other hand the breaker for reinforcing the tread, with a relatively hard rubber mixture, and making the breaker relatively large.

By a relatively hard rubber mixture is understood a mixture which has, after vulcanisation, a Shore hardness A of above 75 and a modulus of elasticity at least equal to 100 kg. per sq. cm. of 200% elongation, while the corresponding mixtures which are usually used have a Shore hardness A not exceeding 60 and a modulus of elasticity not more than 60 kg. per sq. cm. at 200%. By a relatively large breaker is to be understood a breaker, the size of which is clearly greater than the size of the area of contact with the ground of the tread of the tire in the normal conditions of pressure of inflation and of load of the tire. For the tires of private vehicles the size of the breaker is at least 10 to 20% greater than the size of the surface in contact with the ground.

These two features set out above are known separately. Thus it is already known to have in tires of this type a breaker made up of layers of cables making a small angle with respect to the equatorial plane and coated, for example by calendering with hard rubber mixtures. The object was mainly to increase the actual rigidity of the breakers, thereby to obtain a better resistance to wear and tear at normal speeds of road vehicles.

It has also been envisaged to use breaker layers of various sizes but no satisfactory result has been obtained up to now with breakers which are substantially larger than the contact surface of the tread, because the edges of the breaker reached in this case the area of the beads subjected during operation to intense flexions causing the edges of the breaker to loosen or detach.

It is difficult to explain why the behaviour of a tire according to the invention at high speed is better than that of the known tires; it may be that the simultaneous use of hard mixtures in the carcass layers and in the breaker layers, ensures a better cohesion of the assembly of the breaker layers and carcass layers in the area of the tread of the tire, which enables a better resistance against the nipping stresses of the rubber.

It may also be that the lateral extension of the breaker guides the edges of said breaker into less thick parts of the beads of the tire where the heating during operation is less great. Be that as it may, experiments have shown that tires with calendered mixtures of this type and a breaker which is clearly larger than the tread, resists the tests of high speed at least four and up to ten times longer than identical tires but having a breaker of size not greater than that of the tread.

A tire according to the invention is shown by way of example, in transverse section, in the accompanying drawing.

Referring to the drawing, there is shown a tire casing which comprises as usual a carcass 10 secured around the metal wires 11 of the beads, a breaker layer 12, a tread 13 and wall layers 14. The carcass 10 is constituted, according to the dimension of the tire, by one or more layers of "Cord" tissue each composed of cables oriented along meridian planes. The breaker 12 is constituted by one or more pairs of layers of "Cord" tissues of the same size, the cables forming the layers of each pair being oriented symmetrically along a small angle with respect to the equatorial plane of the tire. This angle is generally between 15 and 20°. The tread 13 externally presents a tread surface 15 with tread patterns suitable for the use envisaged. This surface 15 is generally limited in size by edges 16. When on the contrary, the tread surface is fitted together with the walls of the tire by the rounded edges, it will be considered that the size of the tread surface is that of the contact surface with the ground in normal conditions of pressure of inflation and load, for which the tire must be used.

According to the invention, the carcass layers 10 and the breaker layers 12 are preferably coated by calendering with relatively hard rubber mixtures, i.e. having, after vulcanisation, a Shore A hardness of about 75 and a modulus of elasticity at least equal to 100 kg./cm.$^2$ with 200% elongation. This mixture may be the same for the carcass layers and for the breaker. The production of mixtures of this type does not present particular difficulty. They are generally mixtures containing much carbon black i.e. comprising about 65 parts carbon black per 100 parts elastomer.

In addition, the breaker 12 has, in the finished tire, a size $l_1$ greater by at least 10% than the size $l_2$ of the tread surface, so that the edges $12_1$ of this breaker extend into the area of the shoulders of the tire. This breaker is constituted by layers of superposed tissue having substantially the same size and it is directly applied on the breaker layer with which it is in continuous contact from one edge to the other. The under part and the sides of the breaker are covered by the rubber mixture of the tread 13.

As indicated above, the construction which has just been described enables an excellent behaviour of the tire to be obtained at high speed. This tire is thus particularly suitable for use on fast moving vehicles such as sports cars and racing cars. However, it may also be used in heavy, fast moving vehicles and in aeroplanes. As an indication, the results of comparative experiments will be hereinafter given. Tires of the type described but with ordinary calendering mixtures for the carcass and the breaker and with a breaker having a size which is substantially equal to that of the tread area, have been tested on a trial machine driving the wheel at a speed, corresponding to 200 kilometres per hour in the usual load and ambient heat conditions for this type of experiment. These ordinary tires generally perish after 15 minutes by the edges being loosened from the breaker. Similar experiments have been made in the same conditions with tires according to the invention and these tires withstand the same treatment for a period between 1 and 2½ hours. It will be understood that the times indicated correspond to particularly hard experimental conditions and that they have only a relative significance. However, it will be noted that the resistance time varies between from four to ten times in favour of the tires according to the invention.

Of course, the invention is not strictly limited to the embodiment described which is capable of certain modifications in construction, where they do not affect the essential combination. Thus the cables of the carcass and/or of the breaker may be either made of textile preferably for tires of private vehicles, or of metal for tires having greater dimensions. Textile or metal monofilaments may also be used in place of twisted cables. The tire may be used with or without an inner tube.

I claim:

1. A pneumatic tire casing comprising a radial carcass composed of one or more cord layers, a tread and an inextensible circumferential reinforcement between the carcass and the tread, said reinforcement being composed of one or more pairs of plies in which the cords are symmetrically inclined at a small angle with respect to the equatorial plane of the tire, said one or more cords of the carcass and the plies of the reinforcement being embedded in a relatively hard rubber mixture having a Shore A hardness of at least about 75, and said reinforcement having a width at least 10% greater than the width of the area of contact of the tire tread with the ground under normal conditions of pressure and load.

2. A pneumatic tire casing according to claim 1, wherein said rubber mixture has, after vulcanisation, a Shore A hardness above 75 and a modulus of elasticity of at least 100 kg. per sq. cm. at 200% elongation.

3. A pneumatic tire casing according to claim 1, wherein said pairs of plies are of the same size.

4. A pneumatic tire casing according to claim 2, wherein said pair of plies are of the same size.

References Cited by the Examiner
UNITED STATES PATENTS

| | | | |
|---|---|---|---|
| 1,410,704 | 3/1922 | Mitchell | 152—361 X |
| 2,811,998 | 11/1957 | Bourdon | 152—361 |

FOREIGN PATENTS

| | | |
|---|---|---|
| 1,275,020 | 9/1960 | France. |
| 770,315 | 3/1957 | Great Britain. |

ARTHUR L. LA POINT, *Primary Examiner.*

C. HAEFELE, *Assistant Examiner.*